US006836467B2

(12) United States Patent
Stanley

(10) Patent No.: US 6,836,467 B2
(45) Date of Patent: Dec. 28, 2004

(54) METHOD FOR MODELING RADIOPORTS IN A WIRELESS COMMUNICATION NETWORK DESIGN

(75) Inventor: Richard Alan Stanley, Wayland, MA (US)

(73) Assignee: Verizon Laboratories Inc., Waltham, MA (US)

( * ) Notice: Subject to any disclaimer, the term of this patent is extended or adjusted under 35 U.S.C. 154(b) by 774 days.

(21) Appl. No.: 09/731,638

(22) Filed: Dec. 7, 2000

(65) Prior Publication Data

US 2002/0101834 A1 Aug. 1, 2002

Related U.S. Application Data

(60) Provisional application No. 60/170,501, filed on Dec. 14, 1999.

(51) Int. Cl.$^7$ ................................................. H04Q 7/36
(52) U.S. Cl. ....................................... 370/254; 455/446
(58) Field of Search ......................... 370/254; 455/446, 455/449, 561

(56) References Cited

PUBLICATIONS

Andersen, J.B., Rappaport, T.S. and Yoshida, S. (1995), Propagation Measurements and Models for Wireless Communications Channels, IEEE Communications Magazine, 33 (1), 42–49.
Anderson, H.R., and McGeehan, P. (1997). Optimizing Microcell Base Station Locations Using Simulated Annealing Techniques, IEEE 47$^{th}$ Vehicular Technology Conference, 858–862.
Bernardin, P., Yee, M. F., and Ellis, T. (1998). Cell Radius Inaccuracy. A New Measure of Coverage Reliability, IEEE Transactions on Vehicular Technology, 47 (4), 1215–1226.
Faruque, S. (1998), Science, Engineering and Art of Cellular Network Deployment, Ninth IEEE Intl. Symposium on Personal, Indoor and Mobile Radio Communications PIMRC' 98, Boston, MA 313–317.
Freeman, R.L. (1989) Telecommunication System Engineering, 2$^{nd}$ Ed., John Wiley & Sons, New York, 7–8.
Goldsmith, A.J., and Greenstein, L.J. (1993), A Measurement–Based Model for Predicting Coverage Areas of Urban Microcells, IEEE Journal on Selected Areas on Communications, 11 (7), 1013–1023.
Greenstein, L.J., Noach, A., Chu, T–S., Cimini, L.J., Foschini, G.J., Gans, M.J., Chih–Lin, I., Rustako, A.J., Valenzuela, R.A. and Vannucci, G., (1992). Microcells in Personal Communications Systems, IEEE communications Magazine, 30 (12), 76–88.
Hao, Q., Soong, B–H., Gunzwan, E., Ong, J–T., Soh, C–B. and Li, Z. (1997). A Low–Cost Cellular Mobile Communication System: A Hierarchical Optimization Network Resource Planning Approach, IEEE Journal on Selected Areas in Communications, 15 (7), 1315–1326.
Hata, M. (1980), Empirical Formula for Propagation Loss in Land–Mobile Radio Services, IEEE Transactions on Vehicular Technology, VT–29 (3), 317–325.

(List continued on next page.)

Primary Examiner—Melvin Marcelo
(74) Attorney, Agent, or Firm—Leonard C. Suchyta, Esq.; Joel Wall, Esq.; Meschkow & Gresham, P.L.C.

(57) ABSTRACT

Methods for modeling costs of wireless network infrastructure are described. More specifically, the cost contribution models for modeling radioports are described. Various radioport architectures include a constant channel capacity model (48) and a constant offered load model (82). Under constraints imposed by a class of dense user networks, such as wireless metropolitan area networks, cost models are shown to exhibit convex cost functions having minimums. Processes for analyzing these cost models are described for determining which radioport architecture, provides a least-cost radioport cost segment to the overall network cost.

11 Claims, 10 Drawing Sheets

PUBLICATIONS

Jabbari, B. (1996), Teletraffic Aspects of Evolving and Next Generation Wireless Communication Networks, IEEE Personal Communications, 3 (6), 4–9.

Kristic, D., and Correia, L.M. (1998). Optimisation of Micro–Cellular Areas by Minimising the Number of Base Stations, Ninth IEEE Intl. Symposium on Personal, Indoor and Mobile Radio Communications PIMRC' 98, Boston, MA, 84–88.

Kubat, P., and Vachani, R. (1990). Facilities Planning for Cellular Networks, TM–0278–06–90–446, GTE Laboratories Incorporated, Waltham, MA.

Lee, W.C.Y. (1989) Mobile Cellular Telecommunications Systems, McGraw–Hill, New York, Appendix 1.2.

Lee, W.C.Y., Benz, T., DeMarche, C., Roy, A. and Rados, S. (1992). A New Microcell System in L.A., IEEE Vehicular Technology Society $42^{nd}$ VTC Conference, 637–40.

Maric, S., and Seskar, I. (1992). Microcell Planning and Channel Allocation for Manhattan Street Environments, $1^{st}$ Intl. Conference on Universal Personal Communications, 13.04/1–5.

Pecaric, J.P., Proschan, F., and Tong, Y.L. (1992). Convex Functions, Partial Orderings, and Statistical Applications, Academic Press, San Diego, CA, Chapt. 1.

Sarnecki, J., Vinodrai, C., Javed, A., O'Kelly, P., and Dick, K. (1993). Microcell Design Principles, IEEE Communications Magazine, 31 (4), 76–82.

Shahbaz, M. (1995). Fixed Network Design of Cellular Mobile Communication Networks Using Genetic Algorithms. 1995 Fourth IEEE Intl. Conference on Universal Personal Communications, 163–167.

Stanley, R.A. (1996). A Methodology for Evaluating and Optimizing Wireless System Infrastructure Costs, $7^{th}$ IEEE Intl. Symposium on Personal, Indoor and Mobile Radio Communications PIMRC' 96, k Taipei, Taiwan, 1044–48.

Stanley, R.A. and Levesque, A.H. (1998). Cost–Effective Selection of Radio. Access Ports in Dense Wireless Systems, $9^{th}$ IEEE Intl. Symposium on Personal, Indoor and Mobile Communications PIMRC' 988. Boston, MA.

Stanley, R.A. (1999). Cost–Effective Allocation of Radioports under Constant Offered Load, $4^{th}$ IEEE Intl. Conference on Personal Wireless Communications (LCPWC), Jaipur, India, 316–320.

Vachani, R., Kubat, P., and Fagen, D. (1993). Cost–Effective Facilities Planning for Cellular Networks: The Use and Impact of CNPS, TR–0227–02–93–446, GTE Laboratories, Waltham, MA.

Vicharelli, P.A., and Boyer, P.A. (1998). Propagation Models Used in GRANET for Wireless Network Engineering, TM–1053–07–98–369, GTE Laboratories Incorporated, Waltham, MA.

METHOD FOR MODELING RADIOPORTS IN A WIRELESS COMMUNICATION NETWORK DESIGN

RELATED INVENTION

The present invention claims priority under 35 U.S.C. §119(e) to: "Modeling and Optimizing Wireless Network Infrastructure Economic Cost," U.S. Provisional Patent Application Ser. No. 60/170,501, filed Dec. 14, 1999, which is incorporated by reference herein.

TECHNICAL FIELD OF THE INVENTION

The present invention relates to cost modeling of communication networks. More specifically, the present invention relates to determining cost structures for radioport architectures.

BACKGROUND OF THE INVENTION

Wireless, or cellular, communications networks are based on the concept of dividing a radio coverage area into units called cells, each of which contains a radio access port, or radioport (receiver/transmitter/antenna combination) that communicates with wireless users within the cell. As users move across the terrain, they move from one cell to another. Their calls are handed off from the cell they are leaving to the cell they are entering, ideally without any noticeable effect. By dividing the service area in this manner, it is possible to reuse the frequencies allocated from cellular telephony many times, thereby increasing the efficient use of the allocated spectrum.

Wireless communications is a capital-intensive business, and carriers are continuously seeking to reduce costs associated with cellular communications networks. The total system infrastructure cost of a cellular communications network fixed plant can be decomposed into three major elements: switching, interconnect, and radio access. As such, a total system infrastructure cost may be written as:

$$C_{tot} = C_{sw} + C_{in} + C_{rad} \quad (1)$$

where $C_{tot}$=total system infrastructure cost, $C_{sw}$=total switching and control segment cost Mobile Switching Center/Base Station Controller (MSC/BSC), $C_{in}$=total cost of interconnecting control and radio segments, and $C_{rad}$= total radioport segment cost. Each cost component is a sum of its elemental costs, such as equipment, land, and facilities.

Conventional cellular radio access equipment is large and expensive. Land and buildings required to contain the conventional cellular radio access equipment are similarly large and expensive. Therefore, the radioport segment cost, $C_{rad}$, has traditionally been the largest cost element in cellular systems.

A trend in wireless communications is towards lower-power, more closely spaced radioports, also known as base stations, access points, and base station transceivers. As radioports become smaller, they also become less costly. In particular, smaller, lighter radioports can be mounted on utility poles or the corners of buildings rather than requiring dedicated sites, buildings, and towers. This trend should reduce the real estate costs associated with the larger dedicated sites, buildings, and towers. A reduction in real estate costs consequently results in a reduction of the radioport segment cost, $C_{rad}$.

Many established and developing cellular markets have dense user populations. There are two ways to serve more users within a cellular or microcellular system, the traffic-handling capacity of each cell is increased or more spectrum is used. The traffic-handling capacity improvements are being achieved using advanced technologies such as code division multiple access (CDMA), but these are insufficient, in and of themselves, to provide the additional needed capacity.

Since the absolute amount of spectrum available for a cellular system is fixed and inelastic, additional spectrum can be gained only through reuse, which means closer spacing of cells than is customary in traditional cellular systems. Indeed coverage radii for a personal communications system (PCS) or another microcellular cell is approximately equal to or less than three kilometers. Accordingly, the smaller, more closely spaced, radioports are particularly useful for serving more users in regions of dense user concentrations. Although more of the smaller radioports are needed, their unit costs will drop such that the share of total costs represented by the radioport segment cost, $C_{rad}$, will drop.

Owing to the considerable investment required in a wireless communications network, models have been developed to attempt to optimize the costs of wireless networks. Wireless communications networks are complex systems, and the development of an optimal cost solution for the interconnections of such a complex network is a difficult problem in combinatorial mathematics. However, the problem of designing optimal cost networks has received much study because it is important to the design of networks that they can return a profit to their operators.

In general, these problems do not possess analytical solutions and are typically attacked using various heuristic methodologies. In turn, these heuristic methodologies are mathematically complex and require significant computational power and time. Due to their complexity and cost, the heuristic methodologies are avoided by practicing network designers. In addition, some of the methodologies, are only useful over a small set of reasonable conditions. Yet another problem with prior art techniques is that many of these methodologies are designed to be used only after the radioports have been specified and designed.

For the reasons discussed above, many prior art network cost optimization methodologies are not commonly used in the practical design of wireless network infrastructures, which virtually ensures non-optimal topologies.

SUMMARY OF THE INVENTION

Accordingly, it is an advantage of the present invention that a method is provided for determining system architecture for radioports in a wireless communications network.

It is another advantage of the present invention that the method identifies a cost optimal system architecture for the radioports.

It is another advantage of the present invention that a cost optimal system architecture is identified that is suited for a dense user topology.

The above and other advantages of the present invention are carried out in one form by a method for selecting one of a plurality of radioport architectures of radioports in a wireless communication network. The method calls for specifying parameters associated with the radioports, and computing composite powers for the radioport architectures in response to the parameters. Cost structures are determined in response to the composite powers for the radioport architectures, and the cost structures of the radioport architectures are compared to select the one radioport architecture.

The above and other advantages of the present invention are carried out in another form by a computer-readable storage medium containing executable code for instructing a processor to select one of a plurality of radioport architectures of radioports in a wireless communication network. The executable code instructs the processor to perform operations including specifying parameters associated with the radioports, the specifying operation specifying a constant channel capacity constraint, and computing composite powers for the radioport architectures in response to the parameters. Cost structures are determined in response to the composite powers for the radioport architectures, the cost structures being determined in response to the constant channel capacity constraint. The cost structures of the radioport architectures are compared to choose a least-cost one of the radioport architectures to be the one radioport architecture.

The above and other advantages of the present invention are carried out in yet another form by a computer-based method for selecting one of a plurality of radioport architectures of radioports in a wireless communication network. The method calls for specifying parameters associated with the radioports, the specifying operation specifying a constant offered load constraint, and identifying sizes of coverage areas of the radioports. The method further calls for ascertaining a quantity of radioports to support wireless communication in a total service area of the wireless communication network in response to the sizes of the coverage areas. Composite powers are computed for the radioport architectures in response to the parameters and cost structures are determined in response to the composite powers for the radioport architectures, the cost structures being determined in response to the constant offered load constraint. The determining operation includes applying a cost model to determine costs of one of the radioports responsive to the sizes of the coverage areas and combining each of the costs with the quantity of the radioports to obtain the cost structures of each of the radioport architectures. The cost structures of the radioport architectures are compared to choose a least-cost one of the radioport architectures to be the one radioport architecture.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
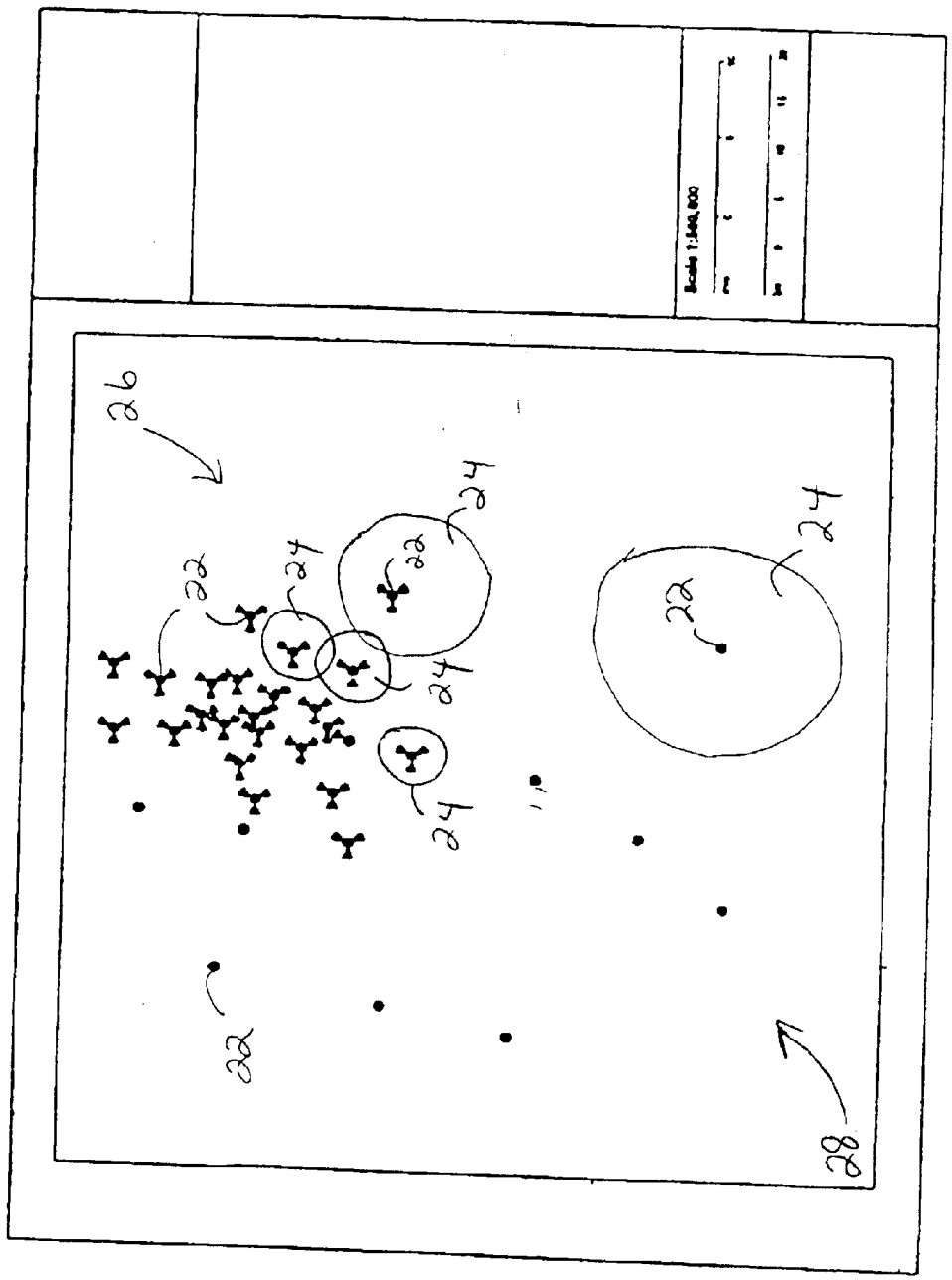
FIG. 1 shows a diagram of a portion of a wireless communications network.

FIG. 1 shows a diagram of a portion of a wireless communications network 20. Network 20 includes a plurality of radioports 22, otherwise known as base stations, access points, base station transceivers, and so forth. Radioports 22 are radio transceivers, used to provide access for mobile users to a wireless communication network 20. Radioports 22 provide radio communication service in their respective coverage areas 24, also known as cells. Some of radioports 22 may include directional antennas, for subdividing their respective coverage areas 24 into sectors to more efficiently provide service in regions of dense user concentrations.

The arrangement of wireless system cells has typically been modeled as a grid of adjoining hexagons (not shown). The hexagonal view is convenient for planning frequency reuse on a first order basis, but it is not well suited to describing actual wireless networks with cells that cover large geographical areas. This is primarily for two reasons. First, when large cells are used, geographical features (hills, valleys, bodies of water, etc.) dominate the propagation domain. Thus, cells must be located where they can achieve line-of-sight coverage to most of the desired coverage area. Second, cell sizes must vary widely to provide many cells per unit area in regions of dense user concentrations, as shown in a first region 26 in the upper right of network 20, and fewer cells per unit area where user densities are lower, as shown in a second region 28 in the lower left of network 20.

This reflects the current state of practice in wireless engineering, which is to locate radioports 22 using educated guesses by inspecting maps of the intended service area. The differences between the hexagonal model used to define frequency reuse and the engineering practice used to locate radioports 22 mean that frequency reuse calculated from the hexagon model is generally quite different from that attained in practice. This has led to the development of complex computer models which exhaustively calculate signal levels at each radioport 22 from every other radioport, and assign frequencies based on the actual co-channel interference that is calculated.

The problem faced by emerging technologies, such as personal communications service (PCS) and International Mobile Telecommunications for the year two thousand (IMT-2000) is somewhat different from that of traditional wireless systems. That is, in order to be profitable, these systems must serve large numbers of users in comparatively small geographical areas. In order to serve large numbers of users, these systems are being designed for significantly increased frequency reuse. Whereas the typical coverage radius of a cell site, or radioport, in an AMPS system is in the order of three to sixteen kilometers, PCS and other microcell services are planned for typical coverage radii of two to three kilometers or less. This means, of course, that it will take many more microcells to cover any given service area than it would take AMPS cells.

It is anticipated that in user dense environments, such as first region 26 spatial dispersal of offered traffic load approaches a uniform distribution. Consequently, if radioport coverage radii are reduced such that traffic density is essentially uniform over a neighborhood of many adjacent sites, than appropriate radioport spacing will be uniform.

If the coverage area layout is modeled by circles of common radii in the user dense environments, then those circular regions can be arranged in a regular geometric fashion. The circular model represents the coverage from some minimum signal strength.

Implicit in this uniform cell arrangement may be an assumption that each radioport 22 in first region 26 provides the same traffic capacity or same number of transmission channels as do other radioports 22. Under conditions of same traffic capacity each of radioports 22 will provide the same grade of service as do other radioports. This is a desirable condition for ubiquitous user mobility through a topology without significant degradation in service. For an initial system design, particularly with uniform spacing of radioports 22 as in first region 26 that is a reasonable assumption.

Exceptionally high-density user clusters or propagation coverage voids that are known during the design phase of wireless network 20 can be covered by overlay radioports 22. High-density user clusters or propagation voids which become known after a network is deployed may be dealt with in a number of ways, including overlay, all of which may be modeled and analyzed using known tools. Accounting for major differences in offered load across a geographic serving area may be dealt with by "banding" cell capacities in a model to correspond to load distribution. These approaches all serve to minimize any difference in grade of service observable by a user. Accordingly, uniform traffic capacity across radioports may be assumed.

Based on the foregoing discussion, modeling the arrangement of radioports 22 as a uniform arrangement of circular cells of common radii is reasonable for networks serving dense user environments, such as in first region 26. Therefore, the uniform cell arrangement will be used hereafter, as will an assumption of uniformly spatially-distributed traffic loading.

The cost of each of radioports 22 depends on several things, but chief among these are channel capacity, power output, and physical construction. The interface circuitry between radioports 22 and the interconnecting infrastructure tends not to be sensitive to coverage radius. Thus, important cost drivers for radioports are the power that they must radiate and the physical construction requirements dictated by their placement. For example, a radioport that operates exposed to the weather will typically cost more than one designed to operate in a protected location, all other factors being equal. However, the protected radioport will incur the costs of a building location. Similarly, a radioport that operates at high power levels at low distortion will be more costly than one of lower power or higher distortion.

The radioport composite power, $P_{comp}$, of a radioport 22 is the total output power which its radio frequency (RF) power amplifier is capable of providing for some specified input at a stated distortion level. Radioport RF amplifiers are typically linear amplifiers. Therefore, the maximum composite power, $P_{comp}$, is available only when the specified input is present.

The power per channel, $P_{ch}$, depends on the number of channels and the composite power. It is the power per channel, $P_{ch}$, not the composite power output, $P_{comp}$, that determines coverage area 24 of the radioport. The best case, i.e., the maximum coverage radius for a channel occurs when $$P_{ch} = \frac{P_{comp}}{N} \quad (2)$$

where
$P_{ch}$=power per channel
$P_{comp}$=maximum radioport composite power
N=number of channels While the power per channel, $P_{ch}$, can always be less than the value given by equation (2), for example, due to forward link power control, it cannot be greater than this value. The power per channel, $P_{ch}$, cannot be greater because the maximum composite power output, $P_{comp}$, from the linear amplifier is available only when the composite input power from N channels is present. Thus, equation (2) provides the upper bound on power per channel, $P_{ch}$, which, in turn, determines the coverage radius, r, of the radioport.

Figure 2:
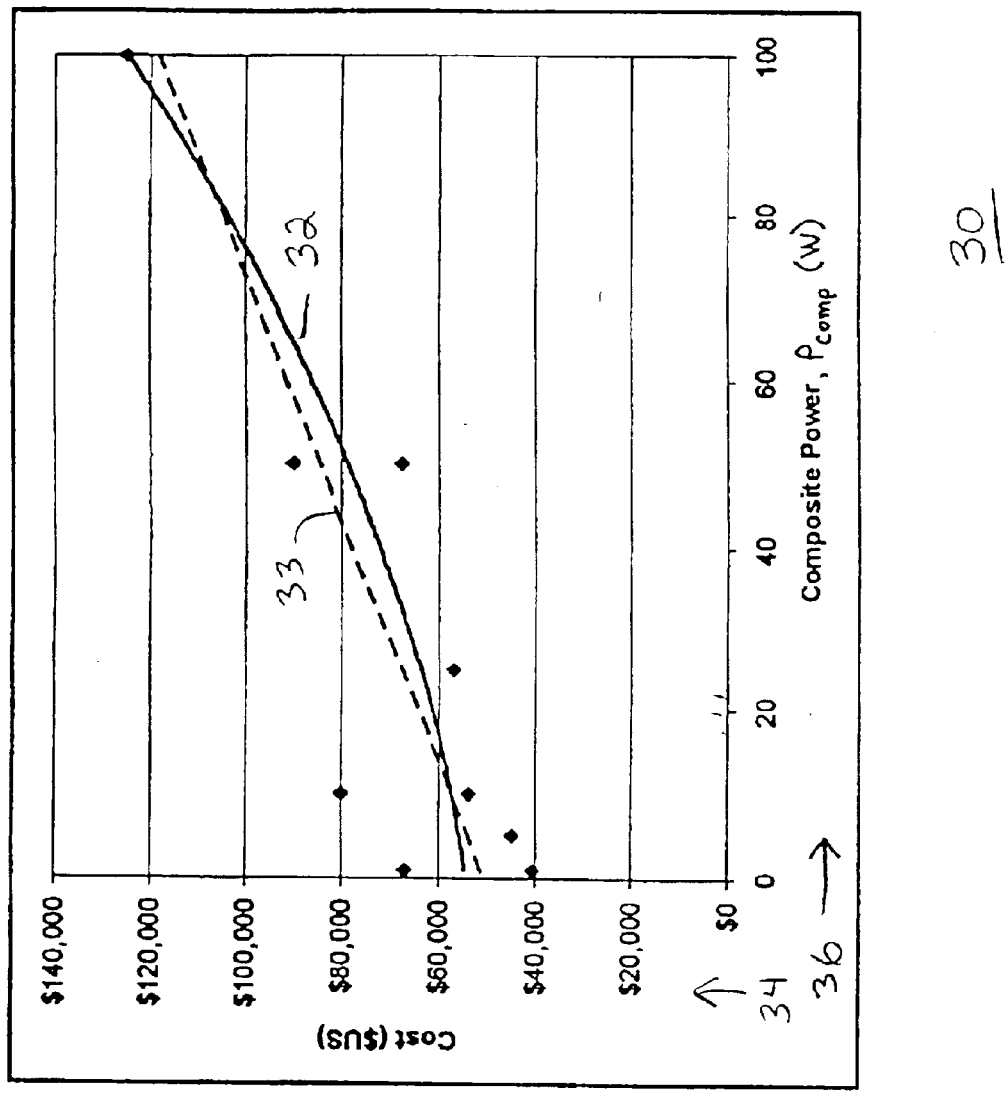
FIG. 2 shows a graph of a cost curve associated with one of the radioports of the wireless network relative to a range of composite powers.

If sufficient data exist, it is possible to plot the cost of small radioports 22 (i.e., those smaller than typically used for cellular service) as a function of their composite power, $P_{comp}$. FIG. 2 shows a graph 30 of cost curves 32 and 33 of exemplary costs 34 associated with one of radioports 22 (FIG. 1) of wireless network 20 (FIG. 1) relative to a range of composite powers, $P_{comp}$, 36. Cost curves 32 and 33 are continuous curves in graph 30. However, in reality composite powers, $P_{comp}$, 36 are discrete. That is, a 37.6-watt radioport is not purchased. Rather a thirty or fifty watt unit is purchased.

As shown in graph 30, the best fit to the data is a least-squares quadratic equation cost model with $r^2=0.7644$ thus forming cost curve 32. The least-squares quadratic equation cost model is as follows:

$$C_r = 4.4095 P_{comp}^2 + 263.04 P_{comp} + 54435 \quad (3)$$

where, $P_{comp}$=composite power of the radioport in watts ($P_{comp}$ greater than or equal to 1 for this data set), and $C_r$=cost of one radioport, measured in U.S. dollars. For this data set, a linear least-squares fit is nearly as good, with $r^2=0.7366$, thus forming cost curve 33. The linear equation cost model that best fits this data is given by:

$$C_r = 676.07 P_{comp}^2 + 50637. \quad (4)$$

Equations (3) and (4) are valid only for this data set. Each wireless network should be evaluated based on the components available for its construction. While these values are satisfactory to develop models for testing, it will be demonstrated below that the cost function is the most sensitive element in determining the total radioport segment cost, $C_{rad}$ (see equation (1)), and should be determined with accuracy for each network design.

Small radioports are specified and purchased according to their composite power, but what is of interest in wireless network infrastructure design is their coverage and traffic-handling capacity. Coverage can be obtained from the per channel power, $P_{ch}$, as defined in equation (2) after some additional parameters are defined, as discussed below.

Radioport Coverage Modeling: Constant Channel Capacity

For networks where the radioport is well clear of surrounding obstacles, radioport coverage can be described by the known Hata representation of Okamura's propagation model, which is given by equation (5). This model is commonly used for wireless network propagation prediction.

$$L_p = 69.55 + 26.16\log_{10}f - 13.82\log_{10}h_b - A(h_m) + (44.9 - 6.55\log 10 h_b)\log_{10}r \quad (5)$$

where $L_p$=path loss (in decibels)

f=frequency (in MHz)

r=distance from transmitter to receiver (coverage radius, in kilometers)

$h_b$=base station (radioport) antenna height (in meters)

$h_m$=mobile station antenna height (in meters)

$A(h_m) = (1.1\log_{10}f - 0.7)h_m - (1.56\log_{10}f - 0.9)$ for a small or medium city Hata's propagation model, as originally developed, is specified over the range $150 \leq f \leq 1500$ MHz and $1 \leq d \leq 10$ kilometers. Taken strictly in its original form, it would not be suitable for characterizing low power radioports with coverage radii less than a kilometer, nor for PCS services in the 1.8–2.2 GHz band. However, field measurements have shown that Hata's propagation model can be "tuned" by adjusting the constants to give quite accurate predictions for specific locales at frequencies at least as high as 3 GHz, and for distances somewhat less than 1 kilometer. Therefore, this model is used herein for propagation prediction.

Although the Hata/Okamura propagation model is used herein, it should be apparent to those skilled in the art that other propagation prediction models may be used. The choice of another propagation model may lead to different specific results, but will not affect the general findings of this analysis.

Path loss can be expressed in terms of both the required minimum received signal strength, $P_r$, and the maximum transmitted power per channel, $P_{ch}$, such that $L_p = P_{ch} - P_r$, which enables equation (5) to be written in the form of equation (6):

$$r = 10\alpha \quad (6)$$

where $$\alpha = \left[\frac{P_{ch} - P_r - 69.55 - 26.16\log f + 13.82\log h_b + a(h_m)}{44.9 - 6.55\log h_b}\right] \quad (7)$$

The coverage model consists of an array of circular regions, each of radius r. Thus, the size of a coverage area, $A_{cell}$, of any radioport can be expressed by utilizing Hata's propagation model in the form of equation (8).

$$A_{cell} = \pi r^2 = \pi 10^{2\alpha} \quad (8)$$

Wireless networks are designed to provide coverage over a known total service area, $A_{tot}$. The number of cells, K, having radio coverage areas, $A_{cell}$, required to cover this total service area, $A_{tot}$ is given by $K = A_{tot}/A_{cell}$ subject to the constraint that each cell have the capacity to handle the same number of channels, as discussed previously. It follows that the total radioport segment cost of the radioports required for a wireless network covering $A_{tot}$ is given by equation (9).

$$C_{rad} = KC_r \quad (9)$$

It is now possible to express the total radioport segment cost, $C_{rad}$, to cover the total service area, $A_{tot}$, in terms of the composite power, $P_{comp}$, of an individual radioport, the number of channels, N, supported by the radioport, and the radioport unit cost, $C_r$, by combining the results of equations (2), (8), and (9) to arrive at equation (10).

$$C_{rad} = C_r \frac{A_{tot}}{\pi 10^\beta} \quad (10)$$

where:

$$\beta = \left[\frac{20\log(P_{ch}) - 2P_r - 139.1 - 52.32\log f + 27.64\log h_b + 2A(h_m)}{44.9 - 6.55\log h_b}\right] \quad (11)$$

It is instructive to examine the nature of the fractional term that multiplies $C_r$. Let $$C_f = \frac{A_{tot}}{\pi 10^\beta} \quad (12)$$

Then, $$\frac{\partial C_f}{\partial P_{ch}} = 20 \frac{A_{tot}}{\pi P_{ch}(44.9 - 6.55\log h_b) \cdot 10^\beta} \quad (13)$$

$$\frac{\partial^2 C_f}{\partial P_{ch}^2} = \quad (14)$$

$$400 \frac{A_{tot}}{\pi P_{ch}^2 (44.9 - 6.55\log h_b)^2 \cdot 10^\beta} + 20 \frac{A_{tot}}{\pi P_{ch}^2 (44.9 - 6.55\log h_b) \cdot 10^\beta}$$

For any real networks, $A_{tot} > 0$, $P_{ch} > 0$, $h_b \geq 0$, $P_r \leq 0$, $f > 150$, and $A(h_m) \geq 0$. Furthermore, $(44.9 - 6.55\log h_b) \geq 0$ for $h_b \leq 7.161 \times 10^6$ is also true. Under these constraints:

$$\frac{\partial C_f}{\partial P_{ch}} > 0, \quad \frac{\partial C_f}{\partial P_{ch}^2} > 0 \quad (15)$$

The conditions of equation (15) are sufficient to assert that, under the constraints described, equation (12) is convex on the range of $P_{ch}$. Indeed, equation (12) is asymptotic to the axes in the first quadrant. It should be noted that the power per channel, $P_{ch}$, is related to the minimum required received signal strength, $P_r$, by a constant (i.e., equation (2)). So, it can be asserted that equation (12) is convex on $P_r$. Equation (10) is therefore the product of a convex function and another function, $C_r$. As such, the equation (10) is convex over the range of $P_r$ for linear or convex $C_r$, and possibly even for mildly concave $C_r$. This implies that there exists a choice of radioport composite power, $P_{comp}$, and number of radioports, K, that yields an optimal cost solution for the radioports required to cover the total service area, $A_{tot}$. Both cost curves 32 and 33 describing the radioport costs in graph 30 (FIG. 2) are convex, so an optimal cost solution is readily apparent.

Figure 3:
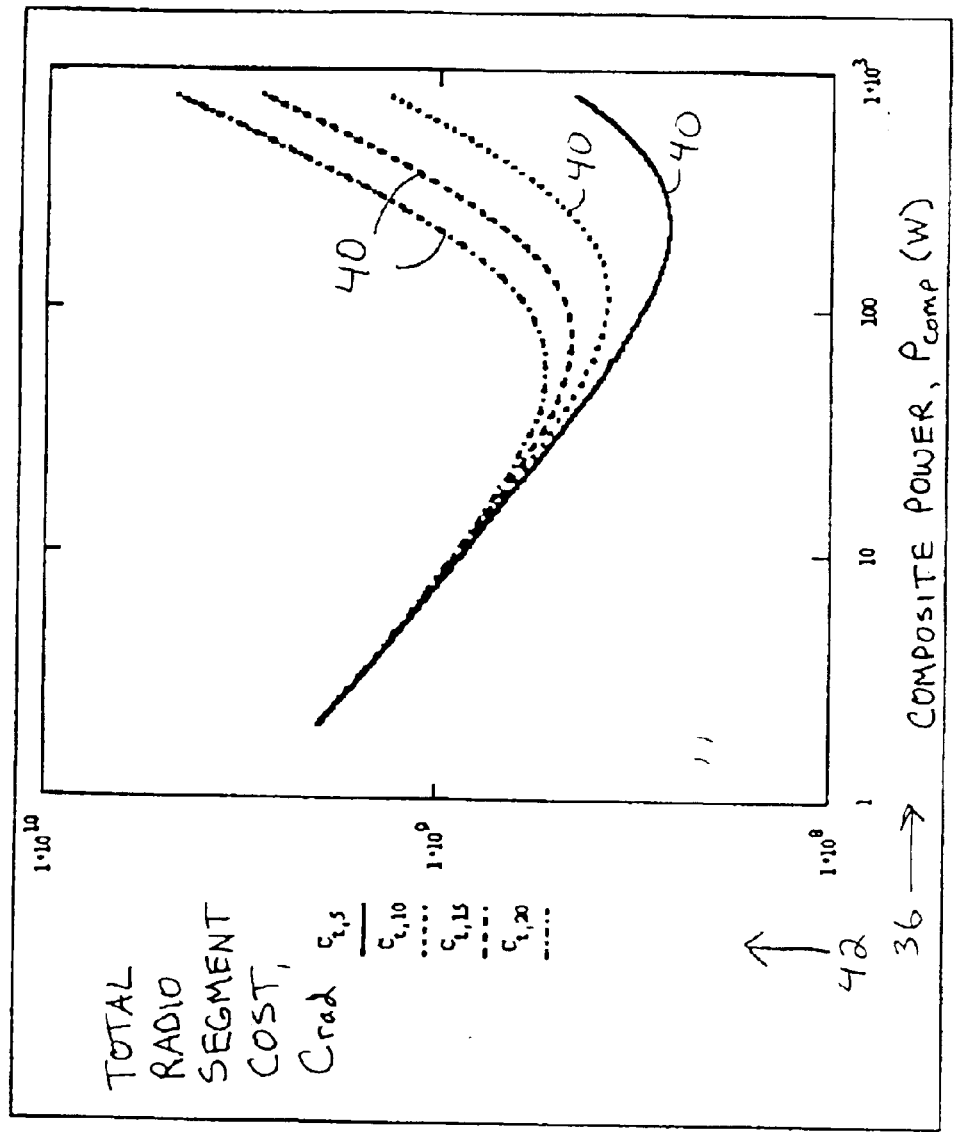
FIG. 3 shows a graph of cost curves describing the relationship between composite powers and the total radio segment cost, $C_{rad}$, for radioports using a quadratic cost model.
Figure 4:
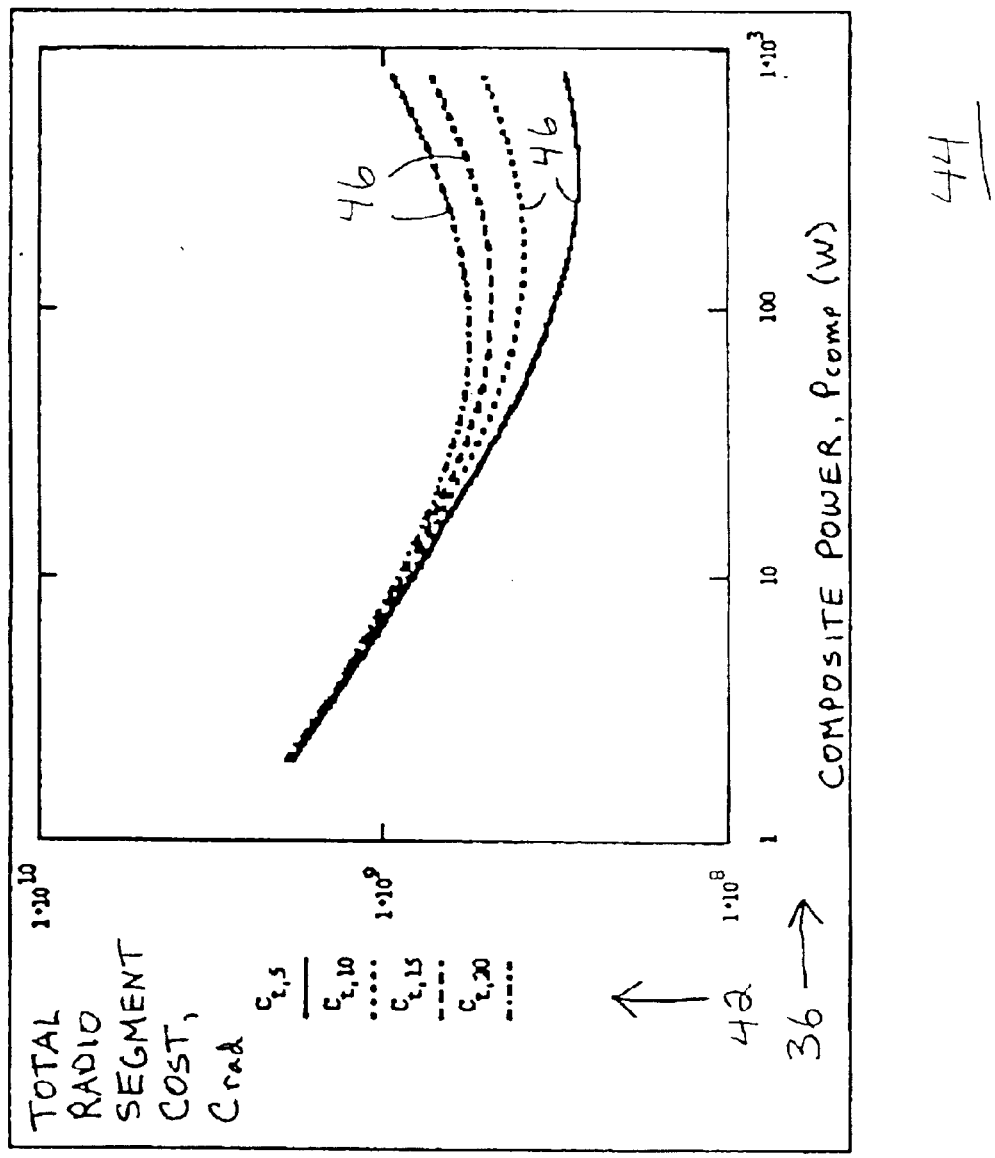
FIG. 4 shows a graph of cost curves describing the relationship between composite powers and the total radio segment cost, $C_{rad}$, for radioports using a linear cost model.

Referring to FIGS. 3–4, FIG. 3 shows a graph 38 of cost curves 40 describing the relationship between composite powers 36 and total radio segment costs, $C_{rad}$, 42 for radioports 22 (FIG. 1) using a quadratic cost model. In particular, graph 38 plots total radio segment costs 42 relative to composite powers 36 using the quadratic cost model of equation (3). FIG. 4 shows a graph 44 of cost curves 46 describing the relationship between composite powers 36 and the total radio segment cost, $C_{rad}$, 42 for radioports using a linear cost model. In particular, graph 44 plots total radio segment costs 42 relative to composite powers 36 using the linear cost model of equation (4). Each of cost curves 40 and 46 represents a different number of channels per radioport, ranging from five to twenty by an increment of five, assuming a total coverage area, $A_{tot}$, of one hundred square kilometers.

The functions plotted in each of graphs 38 and 44 of FIGS. 3 and 4 are strictly convex over their ranges, as they lie entirely below their chords. Graphs 38 and 44 have been plotted on the same scale, permitting 1:1 comparison. It should be noted that the choice of model for radioport costs matters significantly to both the choice of composite power, $P_{comp}$, and to the resultant radioport segment cost, $C_{rad}$. Indeed, had the linear and quadratic expressions of this data set differed more than they do, the differences would have been more marked.

It is worth noting that, had one chosen to model the cost data by a logarithmic function cost model (which has a low coefficient of correlation, but which is a concave function), the plot of total radio segment cost 42 versus composite power 36 is still convex, although not as strongly so. This suggests that under most conditions for realistic systems with radioports of like channel capacity, an analytically determinable cost optimal solution exists for the radioport segment cost.

Figure 5:
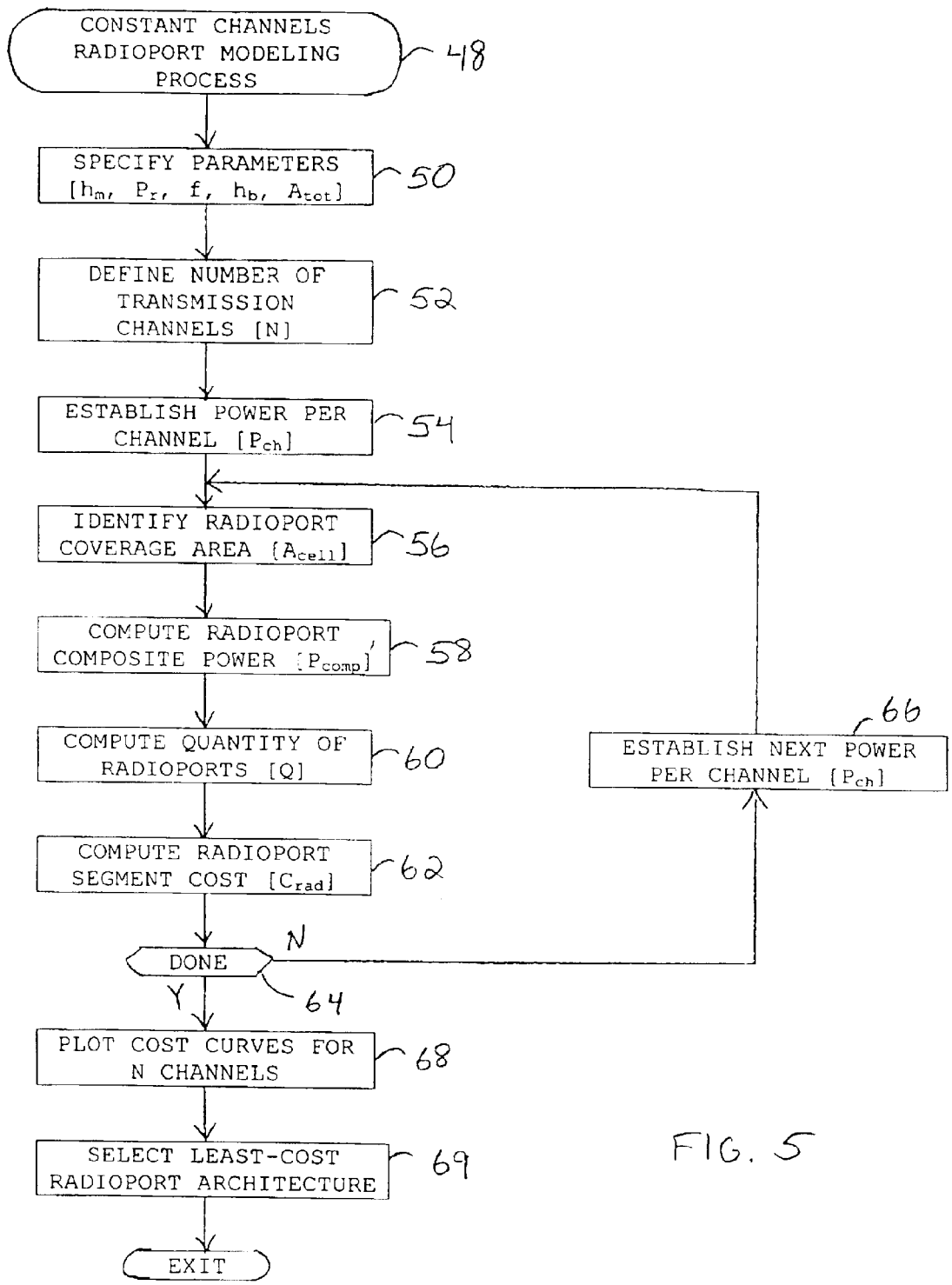
FIG. 5 shows a flow chart of a constant channel capacity radioport modeling process in accordance with a first embodiment of the present invention.

FIG. 5 shows a flow chart of a constant channel capacity radioport modeling process 48 in accordance with a first embodiment of the present invention. Process 48 is performed to select one of a plurality of radioport architectures of radioports 22 (FIG. 1) for first region 26 (FIG. 1) of wireless communications network 20 (FIG. 1). A radioport architecture provides definition for the number of radioports 22 needed to provide service to a total service area, $A_{tot}$, the radioport coverage areas, $A_{cell}$, the power per transmission channel, $P_{ch}$, and the number of transmission channels, N, needed per radioport.

The object of process 48 is to find a least-cost radioport architecture under the conditions of a constant channel capacity constraint. That is, process 48 is subject to the constraint that each of radioports 22 (FIG. 1) in first region 26 have the capacity to handle the same number of transmission channels, as discussed above.

Process 48 may be in the form of executable code contained on a computer-readable storage medium (not shown) which is executable using standard desktop engineering tools and processors. The computer-readable storage medium may include a hard disk drive internal or external to a processor, a magnetic disk, compact disk, or any other volatile or non-volatile mass storage system readable by a processor. The computer-readable storage medium may also include cooperating or interconnected computer readable media, which exist exclusively on a computing system (not shown) or are distributed among multiple interconnected computer systems (not shown) that may be local or remote.

Constant channels radioport modeling process 48 begins with a task 50. At task 50, parameters associated with radioports 22 are specified. Under constant channel capacity constraints, the parameters specified at task 50 include mobile station antenna height (in meters), $h_m$; required minimum received signal strength, $P_r$; frequency (in MHz), f; base station (radioport) antenna height (in meters), $h_b$; and total service area, $A_{tot}$. For clarity of illustration, the following parameters are specified at task 50; $h_m$=2, $P_r$=-92 dBm, f=2000, $h_b$=10, $A_{tot}$=100. In addition, a counting variable, t, is set as t=1, 2 . . . 400.

Following task 50, a task 52 is performed. At task 52, a number of transmission channels, N, is defined. In the illustrative example, the number of transmission channels is defined in increments of five, that is, N=5, 10, 15, 20. However, as discussed previously the number of transmission channels, N, is held constant for each of radioports 22 in the total service area, $A_{tot}$, for a given radioport architecture.

A task 54 is performed in response to task 52. At task 54, a power per channel, $P_{ch}$, is established. In an exemplary embodiment power per channel, $P_{ch}$, is established using the following function, $P_{ch}$=0.1t, where t is the counting variable specified in task 50. Hence, at task 54, the power per channel, $P_{ch}$=0.1 Watts.

Following task 54, a task 56 identifies radioport coverage area, $A_{cell}$. As discussed previously, the size of the coverage area of any cell, $A_{cell}$, can be expressed by utilizing Hata's propagation model in the form of equation (8). Furthermore, as shown in equation (7), the coverage area of any cell, $A_{cell}$, depends in part upon the power per channel, $P_{ch}$. Hence, in the execution of task 56, a large value of power per channel, $P_{ch}$ will yield a larger coverage area, $A_{cell}$, than a smaller value of $P_{ch}$, all other variables being held constant.

Following task 56, a task 58 computes radioport composite power, $P_{comp}$, using equation (2) for each of the N transmission channels defined in task 52 and the power per transmission channel, $P_{ch}$. That is, $P_{comp}$=$NP_{ch}$ is computed for each of N=5, N=10, N=15, and N=20.

In response to task 58, a task 60 is performed to compute a number of cells, hence the quantity, Q, of radioports 22 needed to provide service in total service area, $A_{tot}$, given the identified sizes of radioport coverage areas, $A_{cell}$. The quantity of radioports 22 is computed under the realization that $Q=A_{tot}/A_{cell}$.

A task 62 is performed in connection with task 60. At task 62, the total radioport segment cost, $C_{rad}$, is computed by employing equation (9). In the exemplary illustration the cost of one radioport, $C_r$, is modeled by applying the linear fit cost model of equation (4). Hence, $C_{rad}$ at counting variable t, and N transmission channels is represented by:

$$C_{rad}(t, N) = \frac{A_{tot}}{A_{cell}}(50637 + (676.09NP_{ch}))$$

$$= A_{tot} \cdot \frac{[50637 + (676.09NP_{ch})]}{\pi 10^{\left(\frac{2 \cdot 10\log(P_{ch}) - 2 \cdot P_{ch} - 139.1 - 5232 \cdot \log(f) + 27.64 \cdot \log(h_b) + 2 \cdot A_{cell}}{44.9 - 6.55 \cdot \log(h_b)}\right)}}$$

Thus at task 62, the total radioport segment cost, $C_{rad}$, is computed for each of N=5, N=10, N=15, and N=20 channels allocated to each of radioports 22.

Following task 62, a query task 64 determines if process 48 is complete. In this exemplary illustration, process 48 is done when the counting variable, t, is equivalent to its predetermined maximum. In this case, the predetermined maximum of t, specified at task 50, is 400. Thus, when query task 64 determines that the counting variable, t, is less than or equal to 400, process 48 is not complete, and program control proceeds to a task 66.

At task 66, a next power per channel, $P_{ch}$, is established by incrementing the counting variable, t, and recomputing, $P_{ch}$=0.1t.

Following task 66, program control loops back to task 56 to compute the radio coverage area, $A_{cell}$, in view of the next power per channel, $P_{ch}$, and to ultimately compute the total radio segment cost, $C_{rad}$, given the incremented power per channel, $P_{ch}$. As such, under the condition of a constant channel capacity constraint, process 48 iteratively varies the channel transmission powers, or power per channel, $P_{ch}$, and calculates composite powers, $P_{comp}$, in response to the defined number of transmission channels, N, and the varying channel transmission powers.

When query task 64 determines that process 48 is done, that is, the counting variable, t, exceeds the predetermined maximum of 400, process 48 proceeds to a task 68.

At task 68, cost structures, in the form of cost curves, are plotted for each of the N=5, N=10, N=15, and N=20 transmission channels. Referring to FIG. 4 in connection with task 68, graph 44 shows cost curves 46 for each of the N=5, N=10, N=15, and N=20 transmission channels plotted at task 68. As discussed previously, the cost structures illustrated by cost curves 46 describe the relationship between composite powers 36 and the total radio segment cost, $C_{rad}$, 42 for radioports using the linear cost model of equation (4).

A task 69 is performed in connection with task 68. At task 69, a least-cost one of the radioport architectures is selected. With continued reference to graph 44 of FIG. 4, since cost curves 46 are convex, an analytically determinable cost optimum solution exists for the radioport access segment, at the point along each of cost curves 46 where total radioport segment costs, $C_{rad}$, 42 are at a minimum.

At this minimum total radioport segment cost, $C_{rad}$, for a particular number of transmission channels, N, the minimum composite power, $P_{comp}$, is readily ascertained. From this minimal composite power, $P_{comp}$, the cost optimal quantity of radioports having radio coverage areas, $A_{cell}$, for supporting wireless communication in the total service area, $A_{tot}$, of wireless network 20 (FIG. 1) and power per channel, $P_{ch}$, values associated with the composite power, $P_{comp}$ are specified to reveal the least-cost radioport architecture responsive to a constant channels capacity constraint. Following task 69, process 48 exits.

Radioport Coverage Modeling: Constant Offered Load

As discussed previously, an economically optimum solution for radioport size (i.e., coverage area, $A_{cell}$) was found under conditions of equal channel capacity at all radioports 22 (FIG. 1) as illustrated through the execution of constant channels radioport modeling process 48 (FIG. 5). The problem of determining an economically optimum solution for radioport size is now considered from the viewpoint of the offered call traffic load. For purposes of this discussion, it is assumed that the offered load, expressed in Erlangs per unit area, is constant over the geographic area of concern.

Reasonable assumptions in the design of wireless network infrastructure includes infinite traffic sources, equal traffic density per source, and that lost calls are cleared. The Erlang B equation presumes these assumptions and is commonly used to design wireless communications networks. The Erlang B equation is given by:

$$P_b = \frac{\frac{E^N}{N!}}{\sum_{k=0}^{N} \frac{E^k}{k!}} \qquad (16)$$

where:
$P_b$=blocking probability
E=offered load in Erlangs for a unit area at busy hour
N=number of channels (in the serving cell)
Practical networks seek to hold the value of the blocking probability, $P_b$, as constant as possible across the network, so that users experience the same blocking probability, $P_b$, wherever they are. Thus, $P_b$ is held constant in this discussion. The blocking probability, $P_b$, is a quality of service parameter. That is, a lower blocking probability, $P_b$, yields higher quality of service because fewer calls may be blocked as compared to a higher blocking probability, $P_b$, which may result in more calls that may be blocked.

Examining the denominator of equation (16), it is seen that:

$$\lim_{N \to \infty} \sum_{k=0}^{N} \frac{E^k}{k!} = 1 + E + \frac{E^2}{2!} + \frac{E^3}{3!} + \ldots = e^E \qquad (17)$$

Therefore, it is asserted that for a large number of channels, N, $$\sum_{k=0}^{N} \frac{E^k}{k!} \cong e^E \qquad (18)$$

This allows the expression of equation (16) to be written as an exponential approximation as follows:

$$P_b e^E \cong \frac{E^N}{N!} \qquad (19)$$

Equation (19) would usually be solved with N and E as the independent variables to produce the values of the blocking probability, $P_b$, which can take any positive value. In this scenario, the blocking probability, $P_b$, becomes the independent variable. Software exists that evaluates this equation as stated to find N by iteration, and solutions can usually be found. However, many of these solutions will be erroneous. In mathematical terms, it is not possible to compute the factorial of a non-integer. In physical terms, it is impossible to allocate a fractional channel. Thus, only integer values of N have any meaning. To deal with this problem, the approach taken herein is to compute the roots of equation (19) by determining when the residual changes from negative to positive, varying N by integral increments.

Equation (19) can, under some circumstances (e.g., large offered load, E), have two roots. The most positive root of equation (19) for any given values of $P_b$ and E will be denoted $N_{pb,E}$ and is the root sought. It is possible to construct a family of curves for various values of blocking probability, $P_b$, and offered traffic, E, which indicate values for the number of channels, N, under those circumstances. As it turns out, N is not particularly large for small coverage areas and low traffic loads. However, as long as $N \geq 2$, which will always be the case, the approximation of equation (18) is within eight percent, with the accuracy improving as N increases. Thus, the approximation of equation (18) is sufficiently accurate for the purposes of this analysis given that channels are discrete.

The difference between the constant allocated channel and constant offered load models is not trivial. Under the constraints of equation (10), as cells diminish in size the quality of service improves (i.e., the blocking probability decreases) because the same number of channels are allocated to cover a smaller geographical area as were available to cover a larger area. Under the constraints of equation (19), however, the blocking probability remains constant, and the number of channels is allowed to change according to the area, $A_{cell}$, to be covered, which in turn affects the composite power required of the radioport.

Figure 6:
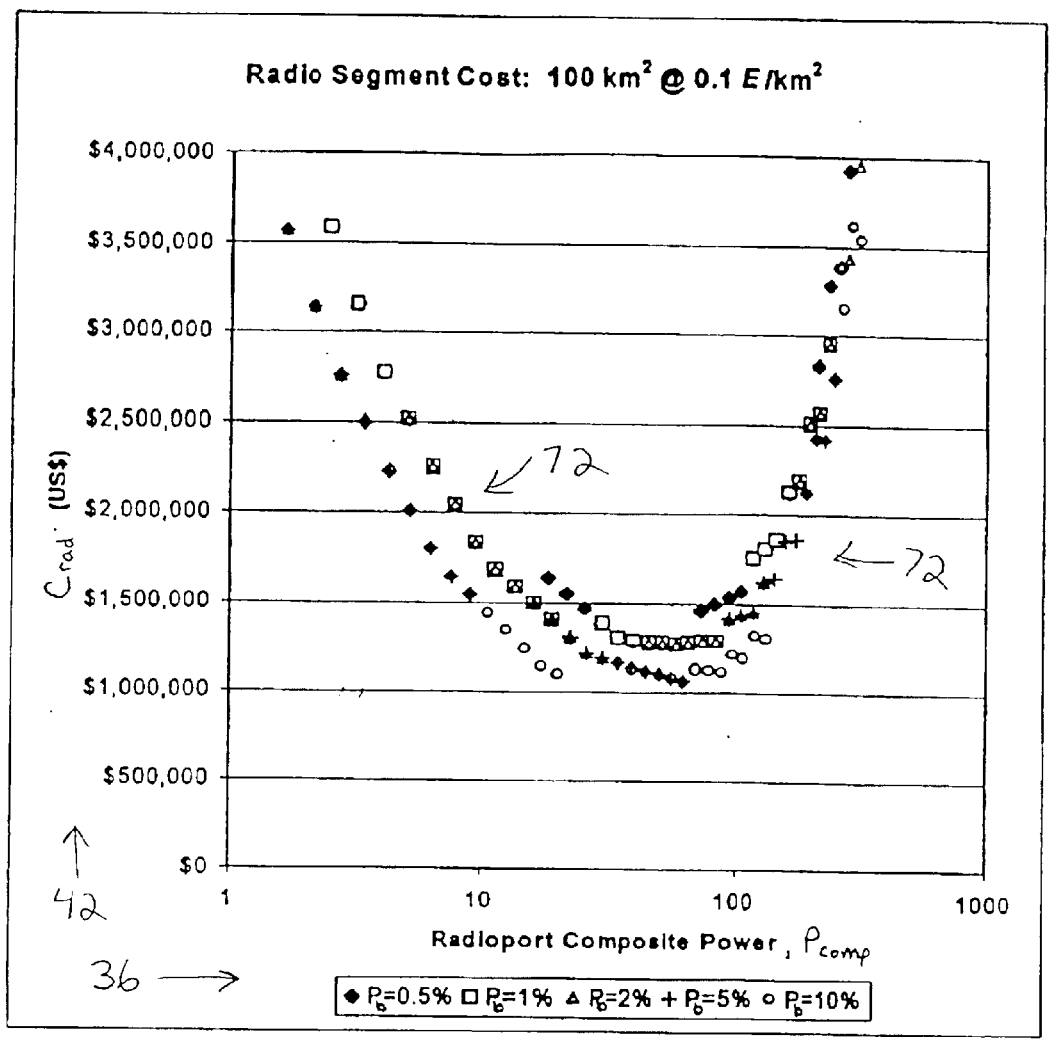
FIG. 6 shows a graph of cost curves describing a difference a constant offered load constraint has on the radio segment cost, $C_{rad}$, for the quadratic cost model of FIG. 3.

FIG. 6 shows a graph 70 of cost curves 72 describing a difference the constant offered load model has on the total radio segment cost, $C_{rad}$, 42 relative to composite powers, $P_{comp}$, 36 for the quadratic cost model of FIG. 3. The essential difference between the constant channel capacity approach and the constant offered load approach is that the results described in graph 70 are not the representation of a continuous function. Indeed, the comparison of graph 38 (FIG. 3) and graph 70 reveals several important similarities and differences between the approaches of providing a constant number of channels and providing a constant offered load, that is, a constant quality of service.

First, the curves plotted in graph 70, although not the representation of strictly continuous functions, appear to meet the essential characteristics of convex functions, as did the curves plotted in graph 38 (FIG. 3). It is generally possible to construct a chord between any two points on the curve below which lies the remainder of the curve, thus indicating the presence of a single global minimum. Because these are not the curves of a continuous function, mathematically it is not possible to prove their convexity directly, but inspection of graph 70 provides a strong case that they are essentially so. Were a mathematical proof of convexity to be required, it is obvious by inspection of graph 70 that the data of any of the curves could be fitted closely to a parabola. As the first derivative of a parabola is strictly increasing and the second derivative is positive, it is strictly convex.

Second, the comparison of graph 38 (FIG. 3) and graph 70 indicates that the minimum cost point under the constraint of constant offered load occurs at a lower composite radioport power, $P_{comp}$. Minimum cost occurs with radioports of approximately 63 watts for a ten percent blocking probability, $P_b$, (represented by squares) and 29.5 watts for a two percent blocking probability, $P_b$, (represented by triangles) in the 0.1 Erlangs/km² constant load situation. As shown in graph 38 (FIG. 3), in the case of constant offered channels, the minimum composite power, $P_{comp}$, for minimum cost for the same number of channels is 354 watts.

This outcome is not totally unexpected, but its magnitude graphically illustrates a major benefit of small radioports serving small radio coverage areas, $A_{cell}$. Small radioports require much less in the way of site space and electrical mains power, and present less environmental impact. These properties contribute profoundly to reducing the site costs for small radioports as compared to larger versions.

Third, the total radioport segment cost, $C_{rad}$, under the case of constant offered load is substantially lower than for the constant offered channel design. For the case of a two percent blocking probability, $P_b$, at 0.1 Erlangs/km2 constant offered load, total radio segment cost, $C_{rad}$, shown in graph 70 is approximately $1.2 million. This is compared to a total radio segment cost, $C_{rad}$, shown in graph 38 (FIG. 3) of $196.2 million in the equivalent situation of constant offered channels, or a ratio of over 160 to 1 in favor of providing constant offered load, i.e., a constant quality of service. Hence, the variance between the two approaches is striking.

Figure 7:
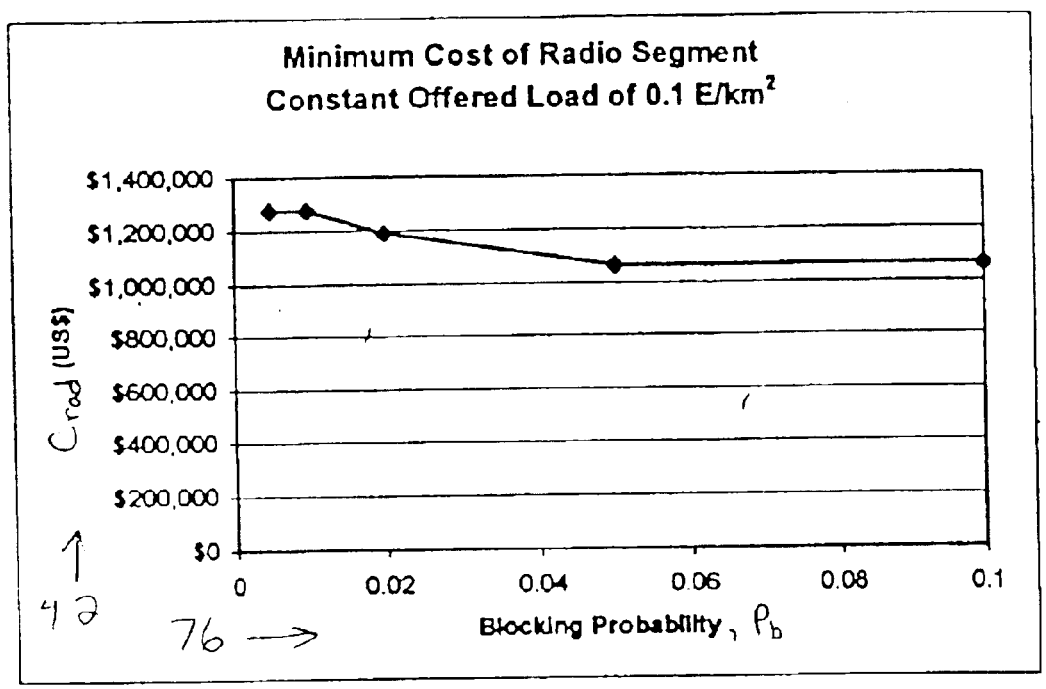
FIG. 7 shows a graph illustrating the total radio segment cost, $C_{rad}$, at different blocking probability parameter values.

FIG. 7 shows a graph 74 illustrating the total radio segment cost, $C_{rad}$, 42 at different blocking probability parameter, $P_b$ values 76. Graph 74 shows that the total radio segment cost 42 of providing an excellent blocking probability, $P_b$, of one half percent are only approximately twenty percent higher than providing a poor blocking probability of ten percent for the example of graph 70 (FIG. 6). Graph 74 shows an even more noteworthy outcome. The total radioport segment cost, $C_{rad}$, 42 is approximately equivalent for blocking probabilities of ten to five percent and for blocking probabilities from one percent to one half percent. Accordingly, it costs nothing additional to reduce the blocking probability, $P_b$, from ten percent to five percent or from one percent to one half percent. The reason for this outcome is that channels must be assigned discretely. That is, one cannot assign a fraction of a channel. Because radio coverage areas, $A_{cell}$, are small in this case, relatively low numbers of channels, N, are required, and adding or deleting a single channel per cell has a large affect on the blocking probability, $P_b$.

The impact of this finding on network design is significant. It is possible to quantify the economics of improved blocking probability, $P_b$ (i.e., higher quality of service), at the initial network design stage. This enables the network to be designed and installed initially with the most likely quality of service in place, at little to no added cost compared to the conventional minimalist approach. Thus, the initial design of wireless communications network 20 (FIG. 1) will have better quality of service than networks designed using more traditional approaches. This, in turn, should lead to higher customer take rates and lower customer churn. It should also preclude the necessity to augment or expand the network for a considerable period, which reduces operating and investment costs. These factors are not readily modeled, but they are critical marketplace realities.

Figure 8:
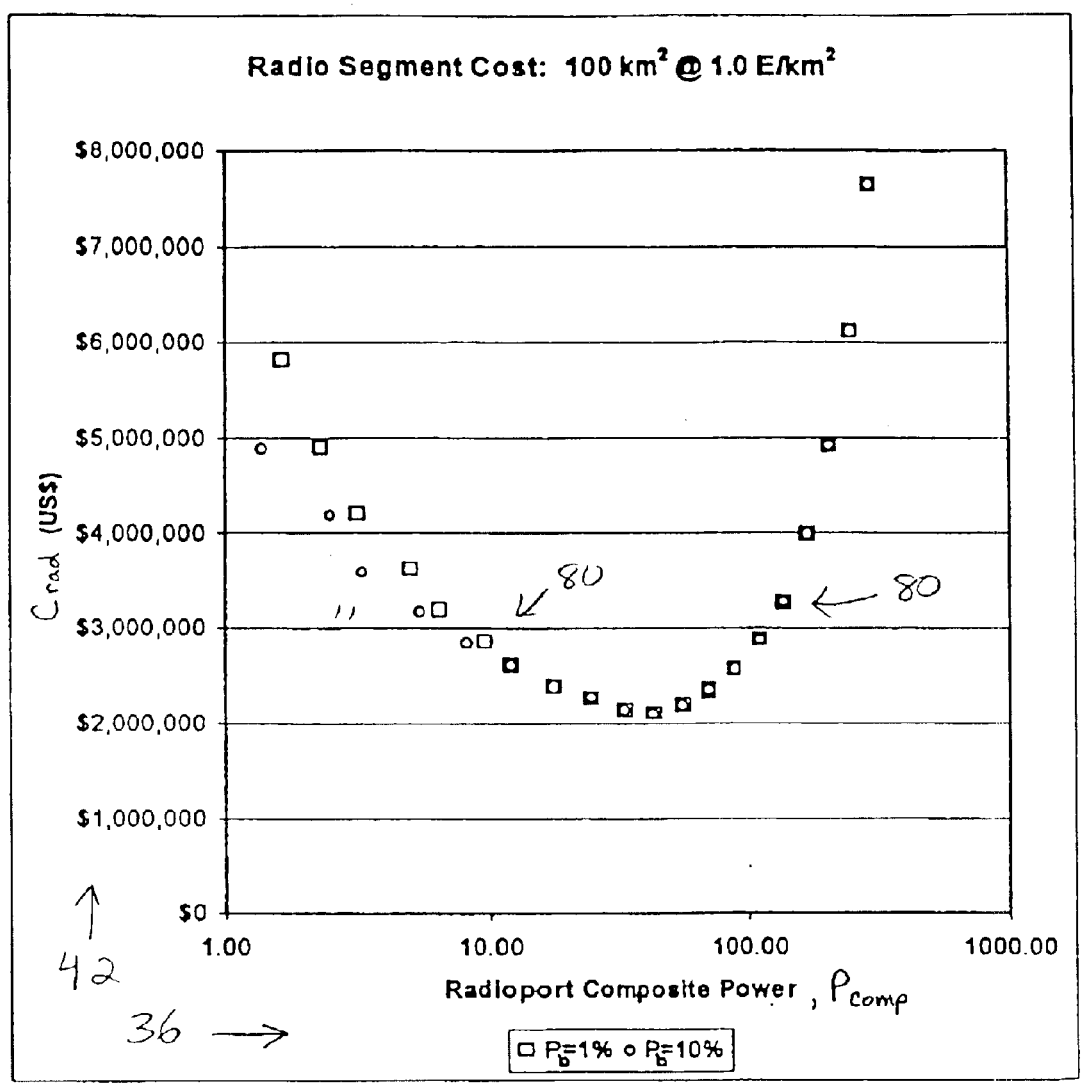
FIG. 8 shows a graph of cost curves describing a difference the constant offered load constraint has on the radio segment cost, $C_{rad}$, under the assumption of a different constant offered load then that of FIG. 6.

FIG. 8 shows a graph 78 of cost curves 80 describing a difference the constant offered load model has on the radio segment cost, $C_{rad}$, 42 under the assumption of a different constant offered load then that of graph 70 of FIG. 6. In particular, cost curves 80 are plotted in graph 78 for the same quadratic cost model and one hundred square kilometer coverage area, $A_{tot}$, that was used in FIG. 6, under the assumption of a constant offered load of 1 Erlangs/km². Graph 78 confirms that the results depicted in FIG. 6 are not unique. That is, it can be seen in graph 78, that cost curves 80, although not strictly convex over their defined range have clear global minima which can be exploited in the design of wireless communications network 20 (FIG. 1).

Graph 78 shows that no added investment is needed to achieve an order of magnitude increase in the grade of service, i.e. the increased offered load of 1.0 Erlangs/km². Accordingly, the total radioport segment cost, $C_{rad}$, under these conditions is not strongly sensitive to the offered load per unit area. The cost curves shown in FIGS. 6 and 8 show that the high cost and uncertainty of comprehensive marketing studies can be avoided in favor of much less expensive surveys and experimental data in designing network 20.

Figure 9:
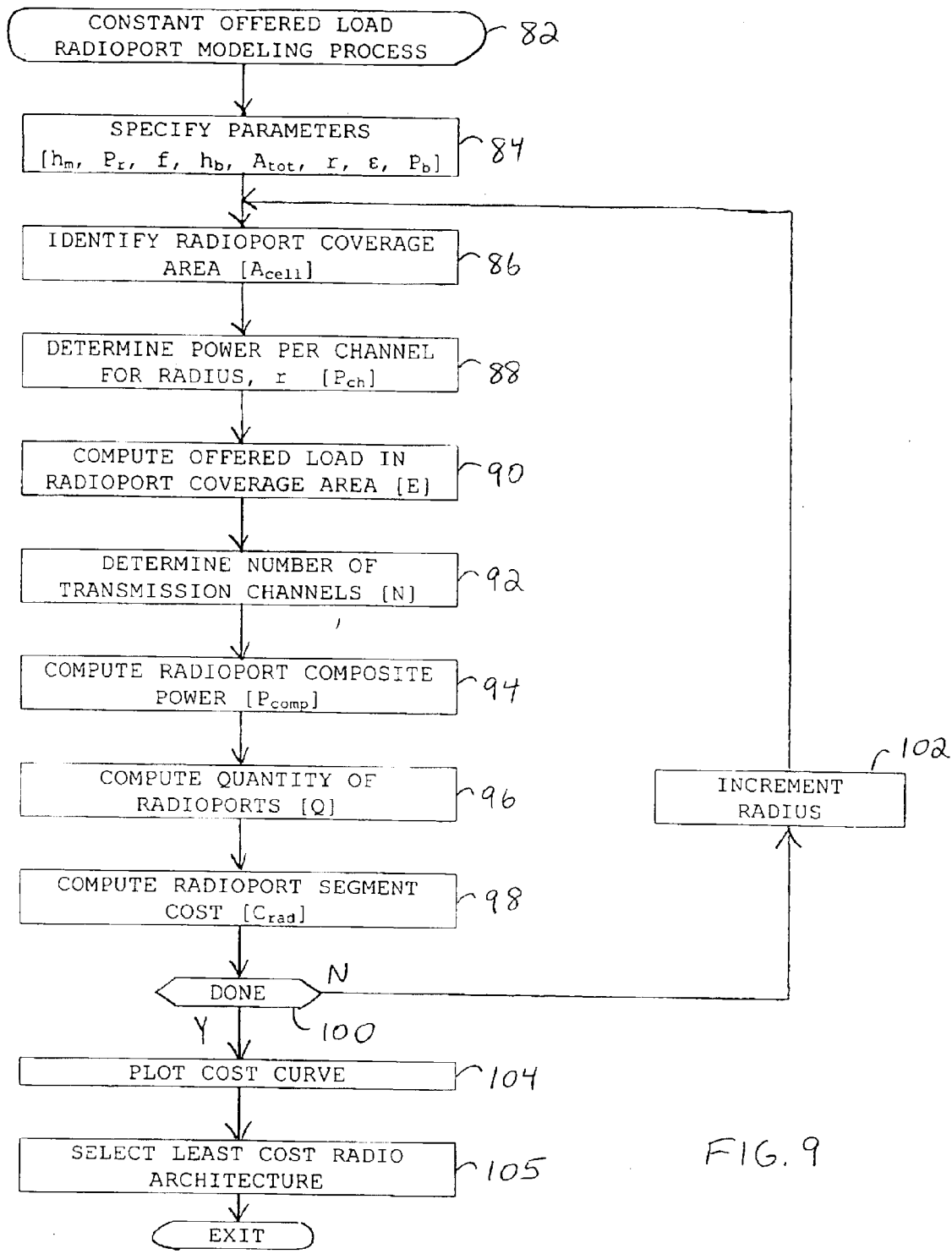
FIG. 9 shows a flow chart of a constant offered load radioport modeling process.

FIG. 9 shows a flow chart of a constant offered load radioport coverage modeling process 82 in accordance with a second embodiment of the present invention. Like process 48 (FIG. 5), process 82 is performed to select one of a plurality of radioport architectures of radioports 22 (FIG. 1) for first region 26 (FIG. 1) of wireless communications network 20 (FIG. 1). As discussed previously, a radioport architecture provides definition for the number of radioports 22 needed to provide service to a total service area, $A_{tot}$, the radioport coverage areas, $A_{cell}$, the power per transmission channel, $P_{ch}$, and the number of transmission channels, N, needed per radioport.

The object of process 82 is to find a least-cost radioport architecture under the conditions of a constant offered load constraint. That is, process 82 is subject to the constraint that each of radioports 22 (FIG. 1) manages the same, or a constant, offered call traffic load in first region 26 as discussed above. As discussed in connection with process 48 (FIG. 5), process 82 may be in the form of executable code contained on a computer-readable storage medium (not shown) which is executable using standard desktop engineering tools and processors.

Constant offered load radioport modeling process 82 begins with a task 84. At task 84, parameters associated with radioports 22 are specified. Like process 48, the parameters specified at task 84 include mobile station antenna height (in meters), $h_b$; required minimum received signal strength, $P_r$; frequency (in MHz), f; base station (radioport) antenna height (in meters), $h_b$; and total service area, $A_{tot}$. In addition, under the constant offered load constraints, the distance from transmitter to receiver (coverage radius, in kilometers), r; the offered load in Erlangs per unit area, E, and a blocking probability, $P_b$, are also specified at task 84. By way of illustration, at task 84 the following parameters are specified $h_m=2$, $P_r=-92$ dBm, f=2000, $h_b=10$, $A_{tot}=100$, $\epsilon=1$ Erlangs/km$^2$, $P_b=0.01$. In addition, radius, r, is specified using the following function, r=0.25+0.01t, where t is a counting variable, specified as t=1, 2, ... 45. During a first iteration of process 82, t=1, therefore radius, r, is 0.26 km.

Following task 84, a task 86 identifies the radioport coverage area, $A_{cell}$. Each of the radioport coverage areas, $A_{cell}$, of radioports 22 (FIG. 1) are defined to be circular regions of common radii, namely radius r. Accordingly the radioport coverage area, $A_{cell}$, are readily computed using equation (8) for the specified radius, r.

In response to task 86, a task 88 determines the power per channel, $P_{ch}$, for the specified radius, r, by applying the Hata propagation model of equations (6) and (7).

Next, a task 90 computes an offered load, E, for each of the radio coverage areas, $A_{cell}$. The offered load, E, is the total load offered in the radio coverage area, $A_{cell}$. Under the constant offered load constraint, each of radio coverage areas, $A_{cell}$, receives the same offered load. As such the offered load, E, can be computed by the following equation, $E=\epsilon A_{cell}$. Following task 90, a task 92 determines the number of transmission channels, N, needed to serve the offered load, E, computed at ask 90. The exponential approximation to the Erlang B equation represented by equation (19) is used as follows:

$$P_b e^E = A^N / N!, \text{ expressed as } F = G(N)$$

$$N(t) := \begin{vmatrix} j \leftarrow \begin{vmatrix} 1 \text{ if } t < 6 \\ (t-5) \text{ otherwise} \end{vmatrix} \\ \text{while } P_b \cdot e^E < \frac{(E)^j}{j!} \\ j \leftarrow j+1 \\ j \end{vmatrix}$$

$$N_t := N(t)$$

Following task 92, a task 94 is performed. At task 94, radioport composite power, $P_{comp}$, is computed. Since power per channel, $P_{ch}$, was determined at task 88 and the number of transmission channels, N, was determined at task 92, radioport composite power, $P_{comp}$, is readily computed by employing equation (2).

In response to task 94, a task 96 computes a quantity, Q, of radioports 22 (FIG. 1) needed to provide service in total service area, $A_{tot}$. Since radio coverage areas, $A_{cell}$, are the same for each of radioports 22, the quantity, Q, is readily computed as $Q=A_{tot}/A_{cell}$.

A task 98 follows task 96. At task 98, the total radioport segment cost, $C_{rad}$, is computed. That is, since the quantity, Q, of radioports computed at task 96 is known, equation (9), and the linear cost model of equation (4) for one of the radioports (4) are combined to compute the total radio segment cost, $C_{rad}$, for the specified radius, r, as $C_{rad}=Q$ (50637+676.09$P_{comp}$).

Following task 98, a query task 100 determines if process 82 is complete. In this exemplary illustration, process 82 is done when the counting variable, t, is equivalent to its predetermined maximum. In this case, the predetermined maximum of t, specified at task 84, is 45. Thus, when query task 100 determines that the counting variable, t, is less than or equal to 45, process 82 is not complete, and program control proceeds to a task 102.

At task 102, the radius, r, is increased by incrementing the counting variable, t, and recomputing, r=0.25+0.01t.

Following task 102, program control loops back to task 86 to compute the radio coverage area, $A_{cell}$, in view of the next radius, and to ultimately compute the total radioport segment cost, $C_{rad}$, given the incremented radius, r.

When query task 100 determines that process 82 is complete, that is, the counting variable, t, exceeds the predetermined maximum of 45, process 82 proceeds to a task 104.

At task 104, a cost curve is plotted relating total radioport segment costs, $C_{rad}$, with composite power, $P_{comp}$, computed under a constant offered load constraint and in view of a particular blocking probability, $P_b$.

Figure 10:
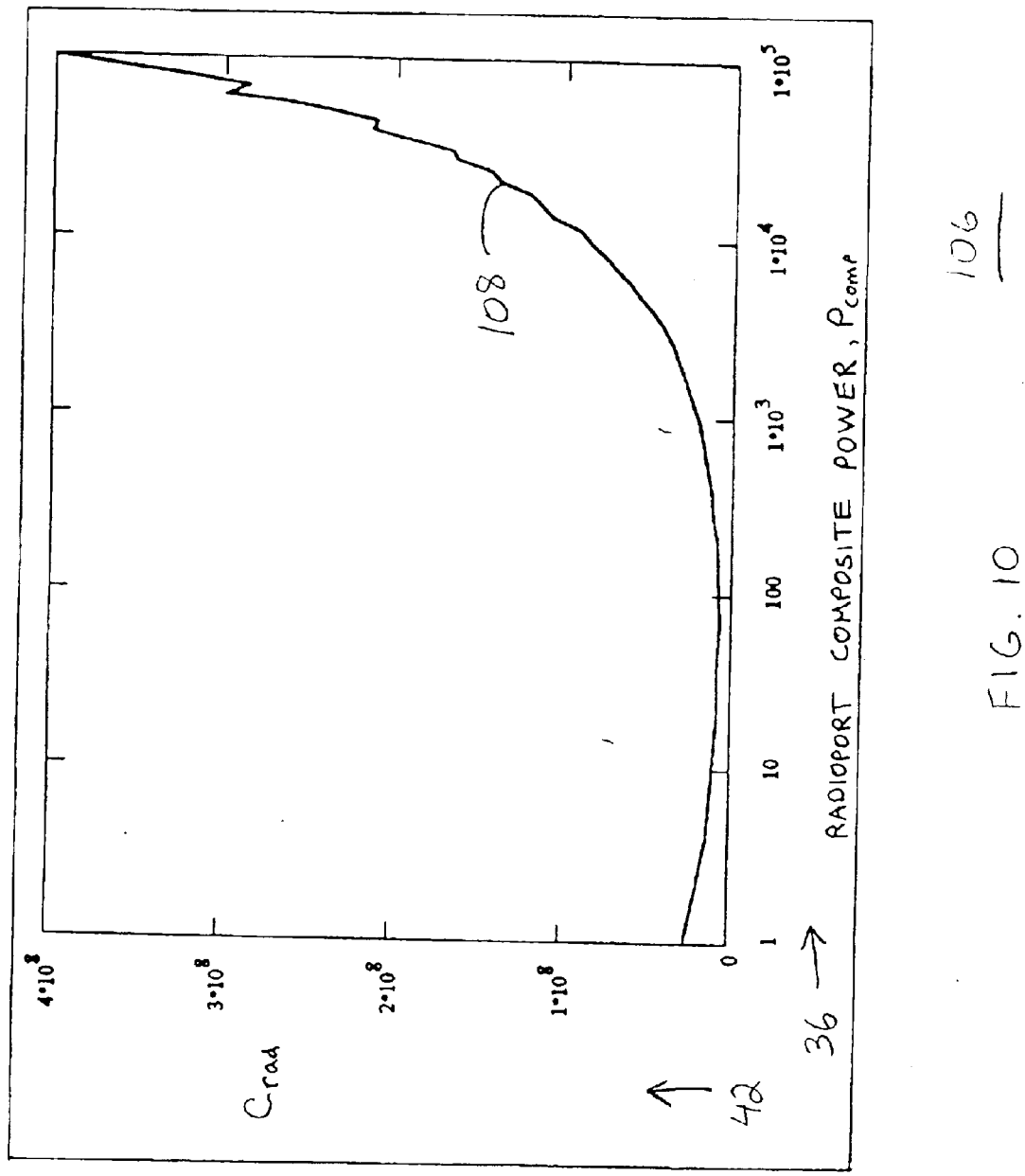
FIG. 10 shows a graph of a cost curve describing the relationship between composite powers and the total radio segment cost generated in response to the modeling process of FIG. 9.

Referring to FIG. 10 in connection with task 104, FIG. 10 shows a graph 106 of a cost curve 106 describing the relationship between composite powers 36 and total radio segment cost, $C_{rad}$, 42 generated in response to task 104 of constant offered traffic radioport modeling process 82 (FIG. 9).

With continued reference to FIGS. 9 and 10, a task 105 is performed in connection with task 104. At task 105, a least-cost one of the radioport architectures is selected. Like graph 44 (FIG. 4) since cost curve 106 is convex, an analytically determinable cost optimum solution exists for the radioport access segment, at the point along cost curve 106 where total radioport segment cost, $C_{rad}$, 42 is at a minimum. As shown in graph 106, a least cost solution can be readily visualized at radioport composite power, $P_{comp}$, of approximately ninety watts. From this minimal composite power, $P_{comp}$, the cost optimal quantity of radioports having radio coverage areas, $A_{cell}$, for supporting wireless communication in the total service area, $A_{tot}$, of wireless network 20 (FIG. 1) and power per channel, $P_{ch}$, values associated with the composite power, $P_{comp}$, and the defined number of channels, N, are specified to reveal the least-cost radioport architecture responsive to a constant offered load constraint. Following task 105, process 82 exits.

It should be understood that nothing in the development of the constant offered load model described in connection with process 82 (FIG. 9) constrains its use to a simple closed surface. The model is equally applicable to coverage areas such as an annulus. Thus, faced with a load model in which the offered load is exponentially decreasing for a distance away from a center point the becoming uniform, one could model annular bands of approximately commensurate offered load, and use the models discussed above to ascertain an economical disposition and coverage area of radioports in that situation. In addition, it is not necessary to segment the offered load too finely, which further decreases the complexity and cost of designing wireless network 20.

The total radioport segment cost, $C_{rad}$, in wireless networks has historically included more than merely the radio equipment. A significant cost element in first-generation cellular systems is the cost of facilities. This includes land, buildings, towers, antennas, utility construction (e.g., electrical power line), backup power equipment, permits, maintenance, and insurance. These costs are often insensitive to the coverage radius, r, of the radioport, at least over reasonable ranges of coverage. However, it is clear that a forty watt radioport that can be mounted on a utility pole will require less facility cost investment than a one thousand watt rural cellsite that must be located in a building with environmental controls, security, and a large antenna and tower.

Small radioports are not devoid of facilities costs. Mounting a radioport on a utility pole or a building has a cost, as does feeding power to it. Typically, these costs are less than for first-generation wireless networks, because the radio equipment itself is smaller, lighter, and less demanding of space and power for its operation. On the other hand, there are more of them than of first-generation cellsites. The facilities cost cannot be ignored.

Facilities costs can be modeled as an additive term to the radioport cost function. If the costs are sensitive to the cell radius, r, or to the number of channels, N, that dependency should be included in the model. However, this is seldom the case. In general, this additive term is nearly constant over the range of parameters being considered. The effect of adding a constant to a convex function is merely to shift the function's ordinate values, not to alter its characteristics. Therefore, the modeling described herein can be used in the general case, with suitable customization for the specifics of the wireless network being designed.

In summary, the present invention teaches of a method for modeling radioports in dense user environments. A total radioport segment cost element, $C_{rad}$, has been shown to be convex so that an optimal cost solution exists. Furthermore, under the constraints identified herein, it has been found that a cost optimal solution may be found analytically rather than heuristically. Accordingly, options for radioport coverage areas may be considered by evaluating the number of channels, N, the composite power, $P_{comp}$, the offered load, and the desired quality of service, selecting the least-cost solution, and applying it to a wireless communication network.

It should be understood that it has been shown that in general, the route to a lower cost infrastructure does not lie in conventional approaches such as simply minimizing the number of radioports in a network, but rather requires a more thorough examination of interacting factors which drive network cost.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the present invention will accommodate a wide variation in the specific tasks and the specific task ordering used to accomplish the processes described herein.

What is claimed is:

1. A method for selecting one of a plurality of radioport architectures of radioports in a wireless communication network, said method comprising:
   specifying parameters associated with said radioports, said specifying operation specifying a constant offered load constraint;
   computing composite powers for said radioport architectures in response to said parameters;
   determining cost structures responsive to said composite powers for said radioport architectures, said cost structures being determined in response to said constant offered load constraint; and
   comparing said cost structures of said radioport architectures to select said one radioport architecture.

2. A method as claimed in claim 1 wherein said computing operation comprises:
   (a) identifying sizes of coverage areas of said radioports;
   (b) determining channel transmission powers for each of said sizes of said coverage areas;
   (c) computing offered load values for said each of said sizes of said coverage areas in response to said constant offered load constraint; and
   (d) determining a number of transmission channels to support said each of said offered load values, said composite powers being computed in response to said number of transmission channels and said channel transmission powers.

3. A method as claimed in claim 2 wherein:
   said method further comprises defining said coverage areas to be circular regions of common radii;
   said specifying operation provides said radii; and
   said operation (a) computes said coverage areas in response to said provided radii.

4. A method as claimed in claim 2 wherein:
   said specifying operation provides a quality of service parameter; and
   said operation (d) comprises approximating said number of transmission channels at each of said offered load values in response to said quality of service parameter.

5. A method as claimed in claim 4 wherein said quality of service parameter is a blocking probability.

6. A method for selecting one of a plurality of radioport architectures of radioports in a wireless communication network, said method comprising:
   specifying parameters associated with said radioports;
   computing composite powers for said radioport architectures in response to said parameters;
   identifying sizes of coverage areas of said radioports, said coverage areas for each of said radioports being circular regions of common radii;
   ascertaining a quantity of radioports to support wireless communication in a total service area of said wireless communication network;
   determining cost structures responsive to said composite powers for said radioport architectures; said determining operation including:
      applying a cost model to determine costs of one of said radioports responsive to said sizes of said coverage areas; and
      combining each of said costs with said quantity of said radioports to obtain said cost structures of each of said radioport architectures; and
   comparing said cost structures of said radioport architectures to select said one radioport architecture.

7. A computer-readable storage medium containing executable code for instructing a processor to select one of a plurality of radioport architectures of radioports in a wireless communication network, said executable code instructing said processor to perform operations comprising:
   specifying parameters associated with said radioports, said specifying operation specifying a constant channel capacity constraint;
   computing composite powers for said radioport architectures in response to said parameters, said executable code instructing said processor to perform further operations including:
      defining a number of transmission channels allocated to each of said radioports, said number being associated with said constant channel capacity constraint;
      varying channel transmission powers for said transmission channels; and calculating said composite powers in response to said number of transmission channels and said varying channel transmission powers;

determining cost structures responsive to said composite powers for said radioport architectures, said cost structures being determined in response to said constant channel capacity constraint, said determining operation including:

utilizing a propagation model to identify sizes of coverage areas of said radioports, said coverage areas for each of said radioports being circular regions of common radii, and said sizes of said coverage areas varying in response to said varying channel transmission powers;

for each of said sizes, ascertaining a quantity of radioports to support wireless communication in a total service area of said wireless communication network;

applying a cost model to determine costs of one of said radioports responsive to said sizes of said coverage areas; and combining each of said costs with said quantity of said radioports to obtain said cost structures of each of said radioport architectures; and comparing said cost structures of said radioport architectures to choose a least-cost one of said radioport architectures to be said one radioport architecture.

8. A computer-based method for selecting one of a plurality of radioport architectures of radioports in a wireless communication network, said method comprising:

specifying parameters associated with said radioports, said specifying operation specifying a constant offered load constraint;

identifying sizes of coverage areas of said radioports;

ascertaining a quantity of radioports to support wireless communication in a total service area of said wireless communication network in response to sizes of said coverage areas;

computing composite powers for said radioport architectures in response to said parameters;

determining cost structures responsive to said composite powers for said radioport architectures, said cost structures being determined in response to said constant offered load constraint, said determining operation including:

applying a cost model to determine costs of one of said radioports responsive to said sizes of said coverage areas; and combining each of said costs with said quantity of said radioports to obtain said cost structures of each of said radioport architectures; and comparing said cost structures of said radioport architectures to choose a least-cost one of said radioport architectures to be said one radioport architecture.

9. A computer-based method as claimed in claim 8 wherein:

said method further comprises defining said coverage areas to be circular regions of common radii;

said specifying operation provides said radii; and said identifying operation computes said sizes of said coverage areas in response to said provided radii.

10. A computer-based method as claimed in claim 8 wherein said computing operation comprises:

(a) determining channel transmission powers for each of said sizes of said coverage areas;

(b) computing offered load values for said each of said sizes of said coverage areas in response to said constant offered load constraint;

(c) for said each offered load value, determining a number of transmission channels to support said each offered load value, said composite powers being computed in response to said number of transmission channels and said channel transmission powers.

11. A computer-based method as claimed in claim 10 wherein:

said specifying operation provides a blocking probability parameter; and said operation (c) comprises approximating said number of transmission channels at each of said offered load values in response to said blocking probability parameter.

* * * * *